July 21, 1964 D. K. COLES 3,141,371

KEYBOARD-TYPE MUSICAL INSTRUMENT

Filed Aug. 18, 1961 10 Sheets-Sheet 1

*INVENTOR.*
DONALD K. COLES

BY Gush & Irish

ATTORNEYS

KEYBOARD-TYPE MUSICAL INSTRUMENT

INVENTOR.
DONALD K. COLES
BY Gush & Irish
ATTORNEYS

KEYBOARD-TYPE MUSICAL INSTRUMENT

Filed Aug. 18, 1961 10 Sheets-Sheet 3

INVENTOR.
DONALD K. COLES
BY Gush & Irish
ATTORNEYS

INVENTOR.
DONALD K. COLES
BY Gust & Irish
ATTORNEYS

INVENTOR.
DONALD K. COLES
BY Gust & Irish
ATTORNEYS

INVENTOR.
DONALD K. COLES
BY Gust & Irish
ATTORNEYS

KEYBOARD-TYPE MUSICAL INSTRUMENT

Filed Aug. 18, 1961 10 Sheets-Sheet 7

INVENTOR.
DONALD K. COLES
BY Gust & Irish
ATTORNEYS

July 21, 1964 D. K. COLES 3,141,371

KEYBOARD-TYPE MUSICAL INSTRUMENT

Filed Aug. 18, 1961 10 Sheets-Sheet 8

INVENTOR.
DONALD K. COLES
BY Gust & Irish
ATTORNEYS

July 21, 1964 D. K. COLES 3,141,371

KEYBOARD-TYPE MUSICAL INSTRUMENT

Filed Aug. 18, 1961 10 Sheets-Sheet 9

INVENTOR.
DONALD K. COLES

BY Gust & Irish

ATTORNEYS

INVENTOR.
DONALD K. COLES
BY Gust & Irish
ATTORNEYS 3,141,371
Patented July 21, 1964

3,141,371

KEYBOARD-TYPE MUSICAL INSTRUMENT

Donald K. Coles, 2505 Capitol Ave., Fort Wayne, Ind.

Filed Aug. 18, 1961, Ser. No. 133,012
21 Claims. (Cl. 8—448)

This invention relates to keyboard-type musical instruments such as organs and pianos, and more particularly to such instruments which are of the electrically actuated or electronic type.

Many people attempt to learn to play the piano or organ; however, only a small percentage ever acquire sufficient proficiency to perform acceptably since the many hours of hard and concentrated practice required to attain proficiency proves to be too great a deterrent to most aspirants. The playing of these instruments which employ the conventional keyboard having seven white and five black digitals per octave is rendered difficult chiefly by virtue of the fact that the non-uniform arrangement of the digitals on the keyboard necessitates the employment of a large number of different fingerings in order to play the various chords in different keys (the term "digital" is here employed to indicate the device which is manually actuated to produce a musical tone, rather than the more common term "key" since it is desired to use the word "key" in its musical connotation).

It is accordingly an object of my invention to provide a keyboard-type musical instrument on which the various chords can be played more easily.

Another further object of my invention is to provide a keyboard-type musical instrument which can be played with music written in an improved notation.

A further object of my invention is to provide an improved keyboard-type musical instrument incorporating a keyboard which may be readily converted from a uniform arrangement of digitals to a conventional arrangement.

A still further object of my invention is to provide an improved keyboard instrument on which music written in the conventional notation may be played more easily.

Yet another object of my invention is to provide an improved keyboard-type musical instrument incorporating a keyboard having a uniform arrangement of digitals and means for providing suitable landmarks associated with the digitals to assist the playing thereon.

Still another object of my invention is to provide an improved keyboard-type musical instrument on which transposition between different keys is made easier.

Further objects and advantages of my invention will become apparent by reference to the following description and the accompanying drawing, and the features of novelty which characterize my invention will be pointed out with particularity in the claims annexed to and forming a part of this specification.

My invention in the preferred embodiment thereof provides a keyboard-type musical instrument comprising a plurality of manually actuated alternate upper and lower digitals (normally black and white respectively) with each lower digital being disposed between a pair of upper digitals. A plurality of tone actuator means are provided equal in number to the digitals and arranged to provide a range of tones and pitches in an approximately equitempered scale. Switching means are provided respectively coupling each of the digitals to respective tone actuator means for actuating the same thereby to provide a uniform keyboard arrangement. A plurality of indicator means are provided respectively associated with predetermined ones of the digitals and means are provided for selectively actuating predetermined groups of the indicator means thereby indicating at least some of the digitals which are normally played upon in corresponding predetermined musical keys.

In a specific embodiment of my invention, switching means is provided having at least first and second positions, the switching means in its first position respectively coupling each of the digitals to respective tone actuator means for actuating the same thereby to provide a uniform keyboard arrangement with each successive lower and upper digital actuating a respective tone actuator means of successively higher pitch. The switching means in its second position couples each of the lower digitals to respective tone actuator means and preselected ones of the upper digitals to the other respective tone actuator means in a successive pattern of first groups of two adjacent upper digitals and second groups of three adjacent upper digitals spaced from the adjacent first groups by one intermediate upper digital. With this arrangement, the intermediate upper digitals are decoupled from the tone actuator means thereby to provide a traditional keyboard arrangement with each successive lower digital and upper digital of the first and second groups actuating a respective tone actuator means of successively higher pitch.

In the drawings:

FIG. 1 schematically shows one octave of a keyboard having the conventional or traditional arrangement of digitals;

FIG. 6 is a schematic illustration showing one arrangement of indicator lamps employed with my invention;

Figure 1:
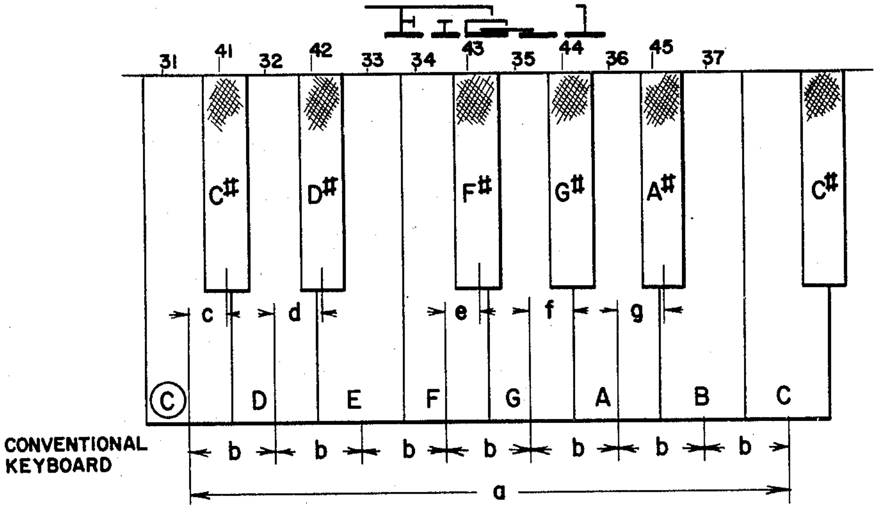

The groupings of musical notes which sound well together are well known and one example of such grouping is the so-called "major triad" which consists of a root tone, a second tone, four semi-tones higher than the root tone and a third tone three semitones above the second tone. If the root tone is identified as number 1, and the intervals between tones are measured in semitones, then the major triad may be designated by the sequence 1–5–8; this triad and the eleven other commonly used chords are set forth in Table I below:

*Table I*

| Chord Name | Chord Symbol | Semitone Numbering from Root Tone | Number of Different Fingerings | | |
|---|---|---|---|---|---|
| | | | Conventional | 5 centered Upper Digitals | 6 centered Upper Digitals |
| Major triad | C | 1–5–8 | 10 | 6 | 2 |
| Minor triad | C*m* | 1–4–8 | 10 | 6 | 2 |
| Augmented triad | C+ | 1–5–9 | 12 | 6 | 2 |
| Major sixth | C6 | 1–5–8–10 | 12 | 8 | 2 |
| Minor sixth | C*m*6 | 1–4–8–10 | 12 | 8 | 2 |
| Dominant seventh | C7 | 1–5–8–11 | 12 | 8 | 2 |
| Minor seventh | C*m*7 | 1–4–8–11 | 12 | 8 | 2 |
| Major seventh | C*ma*7 | 1–5–8–12 | 12 | 8 | 2 |
| Diminished seventh | C– | 1–4–7–10 | 12 | 8 | 2 |
| Dominant ninth | C9 | 1–5–8–11–15 | 12 | 10 | 2 |
| Diminished ninth | C–9 | 1–5–8–11–14 | 12 | 9 | 2 |
| Eleventh | C11 | 1–5–8–11–15–18 | 12 | 11 | 2 |

If a keyboard were constructed containing a single line of digitals respectively connected to tone generators having the conventional equal temperament, the grouping of digitals for a particular chord, for example the major triad, would have the same spacing and thus the same fingering when played in any key. However, such a keyboard would necessarily be constructed of narrow digitals and it would be difficult for the player to strike these digitals accurately.

The keyboard of the primitive organ had only the seven diatonic (white) digitals. In the fifteenth century, the first accidental (black) digital was added corresponding to B flat and later the black digital corresponding to F sharp was added. During the fifteenth and sixteenth centuries, the keyboard gradually became chromatic with the now well known seven white and five black digitals per octave. The present equitempered scale became established in the seventeenth century.

The establishment of equal temperament and the present keyboard of seven white and seven black digitals per octave permitted the composed to roam at will among all keys and to modulate freely. However, chords, phrases and scale passages are required to be fingered differently in the different keys due to the unsymmetrical nature of the keyboard. If the five black or upper digitals of each octave were equally centered between the adjacent white or lower digitals, the mere fact that the black digitals are not symmetrically disposed on the keyboard would result in the requirement for approximately ninety-six different fingerings in order to play twelve common chords in all keys, as shown in Table I above. The situation is further complicated by the fact that the five black digitals of the conventional keyboard are not in fact equally centered with respect to the white digitals, but on the contrary, each black digital of each octave is positioned slightly differently with respect to the adjoining white digitals. Thus, in one conventional keyboard arrangement, as shown in FIG. 1, the following dimensions are provided:

| | Inches |
|---|---|
| *a* | 6.50 |
| *b* | .928 |
| *c* | .371 |
| *d* | .557 |
| *e* | .332 |
| *f* | .464 |
| *g* | .597 |

When the foregoing unequal centering of the five black digitals in the conventional keyboard is considered, a total of 140 different fingerings are required in order to play the twelve common chords in all keys, as again shown in Table I above. Much music today is written in a musical shorthand utilizing symbols for identifying the chords, also as shown in Table I above. Thus, with each chord requiring either 10 or 12 fingerings when played in the 12 different keys, the student is required to accomplish a prodigious feat of memory since the fingerings must be remembered for each chord in every key. Further, since most of the chords can be played in several inversions in which the lowest tone is not necessarily the root tone, the reason for the high attrition rate among students of the piano and organ is readily apparent. Even accomplished musicians will benefit from an improvement in the mechanics of playing, since by giving less attention to the mechanics they can give more attention to the interpretive aspects of the music.

Referring now particularly to FIG. 1, one octave of digitals is shown beginning with middle C (middle C being identified in the drawings by the notation ©). In the conventional arrangement shown, the white or lower digitals 31 through 37 respectively actuate tone generators producing musical pitches of the diatonic scale in the key of C, i.e. middle C, D, E, F, G, A and B, respectively. Likewise, the black or upper digitals 41 through 45 respectively actuate tone generators providing the musical pitches of C♯, D♯, F♯, G♯, and A♯.

Figure 2:
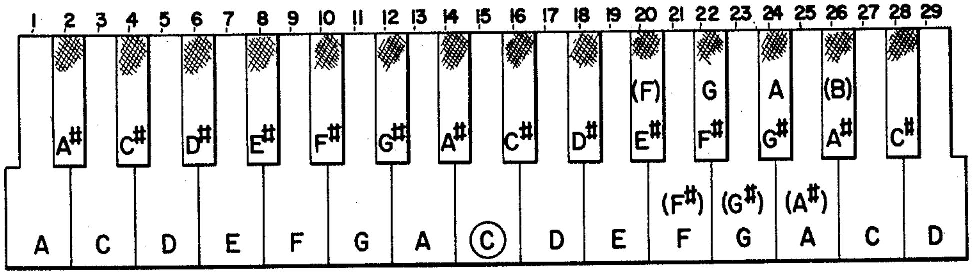
FIG. 2 is a view schematically showing the keyboard of my invention with the uniform arrangement of digitals being employed.

It is possible to construct a keyboard instrument with uniformly spaced digitals as shown in FIG. 2, and such arrangements were proposed in the nineteenth century. One feature of such a uniform keyboard is that center-to-center distances between a pair of digitals are proportional to the musical interval between the corresponding tones. For purposes of the present discussion, the musical intervals between two tones is defined as the natural logarithm of the ratio of the two fundamental vibration frequencies. In accordance with the above proposals, and considering the octave shown in FIG. 2 beginning with middle C, the first five digitals correspond to the first five digitals of the conventional keyboard shown in FIG. 1, i.e. lower digital 15 corresponds to middle C, upper digital 16 corresponds to C♯, lower digital 17 corresponds to D, upper digital 18 corresponds to D♯ and lower digital 19 corresponds to E. However, at this point the similarity ceases and in such prior proposals, upper digital 20 corresponded to (F), lower digital 21 corresponded to (F♯), upper digital 22 corresponded to (G), lower digital 23 corresponded to (G♯), upper digital 24 corresponded to (A), lower digital 25 corresponded to (A♯) and upper digital 26 corresponded to (B). In FIG. 2, parentheses are used with conventional note symbols, while note symbols without parentheses refer to a different notation, to be hereinafter more fully described, which is more suitable for use with a uniform keyboard. Thus, it will be readily seen that with this keyboard arrangement, the diatonic scale in the key of C would be played using the first three lower digitals and the next four upper digitals, i.e. lower digitals 15, 17 and 19 and upper digitals 20, 22, 24 and 26. The diatonic scale of the key of C♯ is played with exactly the reverse fingering arrangement, i.e. upper digitals 16, 18 and 20 and lower digitals 21, 23, 25 and 27. It will now be readily apparent that with the uniform arrangement of digitals as shown in FIG. 2, only two different fingerings are required in order to play the diatonic scales of all the keys, i.e. those having their root tone on a white or lower digital are played with three lower digitals followed by four upper digitals whereas those having their root tone on an upper digital are played with three upper digitals followed by four lower digitals. Since the geometrical pattern of digitals with their associated musical intervals repeats itself six times per octave, it necessarily follows that only two fingerings are required in order to play each chord in every key, i.e. one when the root tone of the chord falls on a lower digital and the other when it falls on an upper digital, as indicated for each chord in Table I above.

Despite the fact that the uniform keyboard arrangement shown in FIG. 2 possesses many advantages especially in the very marked reduction in the number of fingerings required in order to play all of the chords in all of the keys, i.e. from 140 in the case of the conventional keyboard to 24, such uniform keyboard arrangements have not found acceptance for several reasons: the first one being the fact that by virtue of the uniform keyboard arrangement of digitals, it is difficult for the player to orient himself on the keyboard while taking advantage of the uniformity of the keyboard to modulate freely in all keys; and the second reason being the general acceptance of the conventional keyboard arrangement and the reluctance of those who have become proficient on it to change to a different keyboard with only six lower digitals per octave; the third reason being that the accumulated musical literature of centuries must be rewritten to be played on the uniform keyboard; the fourth reason being that a child can learn to use the new keyboard conveniently only if his parents give up playing or keep two instruments in the house; the fifth reason being that, even if a child did learn to play on the uniform keyboard at home and at his teacher's, he could not play at friends' homes or other places except those that possess both types of instrument or those rare places that possess the uniform keyboard instrument alone. For the above reasons, the uniform keyboards were unable to survive.

In accordance with my invention therefore, as shown in FIG. 2, I have provided a uniform keyboard arrangement of white or lower digitals, 1, 3, 5 . . . 29 and black or upper digitals 2, 4, 6 . . . 28, each lower digital being positioned between a pair of upper digitals and each upper digital being positioned between a pair of lower digitals. I have devised a simplified system of musical notation for use with the uniform keyboard of FIG. 2 to be hereinafter more fully described, and for this purpose I have redesignated certain of the pitches or notes, as shown in Table II below:

*Table II*

| Conventional Notation | Uniform Notation |
|---|---|
| Middle C | Middle C |
| C♯ | C♯ |
| D | D |
| D♯ | D♯ |
| E | E |
| F | E♯ |
| F♯ | F |
| G | F♯ |
| G♯ | G |
| A | G♯ |
| A♯ | A |
| B | A♯ |

These two notations may be considered as applying to both the musical tones and the digitals which produce those tones. As an aid in recognizing which notation is being used at particular sequences in the following discussions it is pointed out that a complete sequence of symbols in the conventional notation includes the letter B, while the uniform notation does not include B.

In order to assist the player to orient himself on a uniform keyboard, some system of landmarks is desirable. One possible system of landmarks would be to paint two upper digitals white, namely those marked "U" in FIG. 3 which are absent in the conventional keyboard. This system has the advantage of maintaining a close resemblance to a conventional keyboard, an important consideration if the uniform keyboard is to be successful in overcoming tradition. Fixed landmarks of this type were in fact provided in early attempts in the last century to establish a uniform keyboard.

Preferably music for the uniform keyboard should be written in the conventional way on an upper treble clef of five lines and a lower bass clef of five lines. In this case the system of landmarks to assist the player could consist of an array of ten lines painted on the central part of the keyboard, on the lower digitals, with the two innermost lines separated from each other by a space of four digitals (center-to-center) and the other lines separated from the innermost lines and from each other by a space of two digitals (center-to-center). This system has the advantage of a direct connection between the position of a written note relative to the musical staff and the played digital relative to the system of lines on the keyboard.

The above described fixed landmarks tend, however, to inhibit the ability of the player to modulate freely by moving up and down the uniform keyboard, thus taking maximum advantage of its characteristic that each musical interval occupies the same digital spacing regardless of where on the uniform keyboard it is played.

This ability to move up and down the keyboard at will may be provided by means of movable white caps placed over two upper digitals per octave, to serve as landmarks. Then when the player wishes to play, for example, two semitones higher than the music is written, he could simply move all the white caps to the next upper digital on the right. This scheme provides a method of modulating to other keys which is simple in principle but which is tedious in practice.

Figure 3:
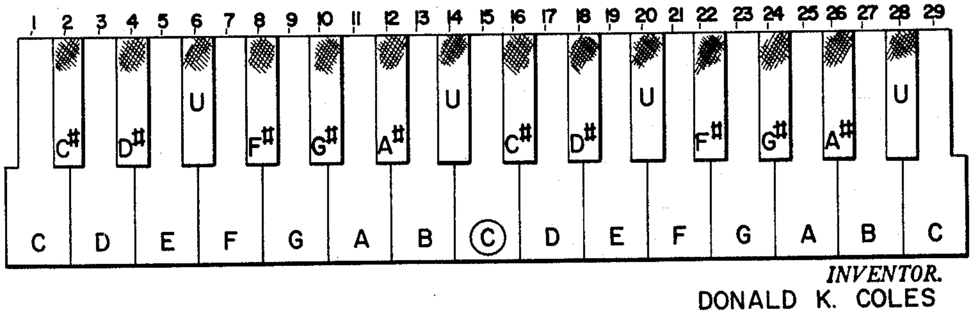
FIG. 3 is a view similar to FIG. 2 but showing partial utilization of the digitals in a conventional arrangement.

In order to eliminate the aforesaid objections to the uniform keyboard arrangement of FIG. 2, I have provided a system of easily movable "landmarks" or indicators, to be hereinafter described, to assist the player in finding and maintaining his position on the keyboard. Further, I have provided a system now to be described which allows conventionally written music to be played by converting the uniform keyboard arrangement of FIG. 2 to a keyboard arrangement which closely simulates the conventional keyboard arrangement, as shown in FIG. 3. Here, it will be observed that the same physical arrangement of digitals is maintained as that shown in FIG. 2, the keyboard in fact of course being the same keyboard, however, I have disconnected upper digitals 6, 14, 20 and 28 from the tone generators to which they were previously connected, these digitals thus being unused and indicated in FIG. 3 by the letter "U." Further, I have reconnected certain of the other lower and upper digitals to tone generators other than the ones to which they were connected in the arrangement shown in FIG. 2 in order to provide a conventional keyboard arrangement. Thus, lower digital 15 which corresponds to the tone or pitch of middle C always provides that pitch in both keyboard arrangements along with upper digital 16, lower digital 17, upper digital 18 and lower digital 19 which respectively correspond to the pitches of C♯, D, D♯ and E above middle C. However, it will be observed that with upper digital 20 being unused, lower digital 21 is now connected to the tone generator having a pitch one semitone above E which in the conventional keyboard arrangement is identified as F. Thus, it will be observed that lower digital 21, upper digital 22, lower digital 23, upper digital 24 and lower digital 25, upper digital 26 and lower digital 27 are respectively connected to tone generators having pitches one semitone lower than the tone generator to which they were connected in the keyboard arrangement of FIG. 2. Upper digital 28 is unused in the keyboard arrangement of FIG. 3 and thus lower digital 29, which corresponds to the pitch of C one octave above middle C is reconnected to the tone generator which was connected to the lower digital 27 in the keyboard arrangement of FIG. 2 and thus now corresponds to a pitch two semitones lower than previously.

The digitals comprising the octave below middle C in the keyboard arrangement of FIG. 3 are similarly reconnected to the tone generators. With upper digital 14 being unused, lower digital 13 now corresponds with the pitch of B below middle C and is thus connected to a tone generator one semitone higher in pitch than in the case of the uniform keyboard arrangement of FIG. 2 and with digitals 12, 11, 10, 9, 8, 7 likewise respectively connected to tone generators one semitone higher than in the case of the uniform keyboard arrangement. With upper digital 6 being unused digitals 5, 4, 3, 2 and 1 of FIG. 3 are respectively connected to tone generators two semitones higher in pitch than in the case of the uniform keyboard arrangement of FIG. 2. It will be readily apparent that in most instances, the keyboard will have more octaves than two and thus the digitals above digital 29 and below digital 1 will be reconnected to respective generators even further removed in pitch from those to which they were connected in the uniform keyboard arrangement.

A comparison of FIGS. 2 and 3 readily reveals that the uniform keyboard arrangement of FIG. 2 provides less keyboard length per octave, provided that the maximum digital widths are equal. It will be observed in the uniform keyboard arrangement of FIG. 2 that all 29 digitals are employed to provide 29 respective notes whereas in the keyboard arrangement of FIG. 3, four fewer notes, i.e. a total of 25 are provided in the same length of keyboard. Further, it will be observed that by virtue of the equal centering of the upper digitals in the conventional keyboard arrangement provided in FIG. 3, the number of fingerings to provide the various chords is reduced from 140 to 96 as shown in Table I above. In employing the keyboard arrangement of FIG. 3 it may be found desirable to place white covers over the unused upper digitals 6, 14, 20 and 28 to further simulate the appearance of the conventional keyboard arrangement.

Figure 4:
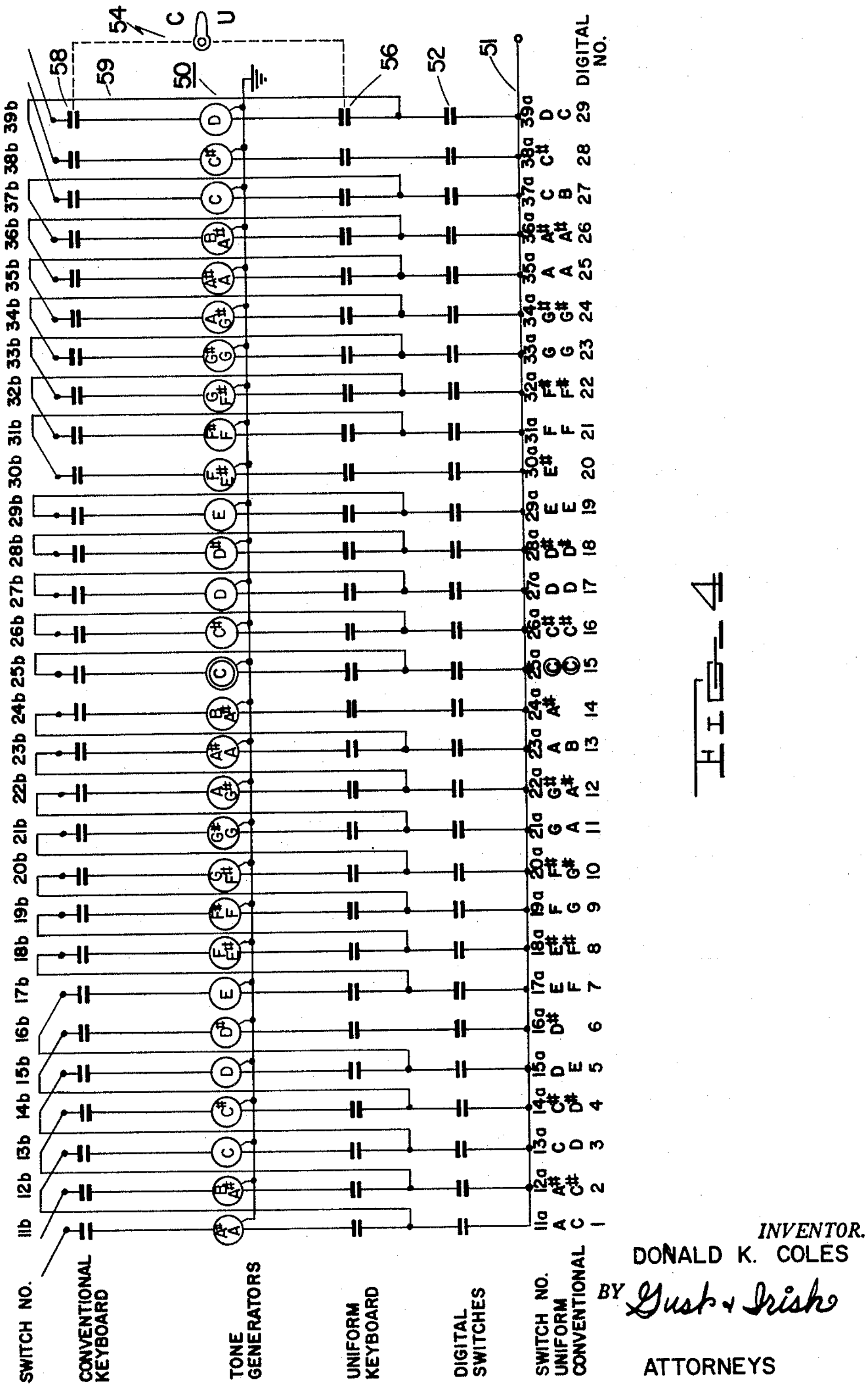
FIG. 4 is a schematic illustration showing a switching arrangement for converting from the uniform arrangement of digitals of FIG. 2 to the conventional arrangement of FIG. 3.

In order to provide for conversion between the uniform keyboard arrangement in FIG. 2 and the conventional keyboard arrangement in FIG. 3, the arrangement shown in FIG. 4 is provided. Here, a plurality of tone actuators 50 are provided equal in number to the total number of digitals of the keyboard, in this case 29, the tone actuators 50 respectively providing a range of tones having pitches in an approximately equitempered scale, i.e. one semitone between each tone generator. It will be seen that the tone actuators 50 provide pitches in octaves of 12 notes and as illustrated the tone actuator having the pitch of middle C is intermediate the remaining tone actuators. Tone actuators 50 are shown grounded on one side. On the other side of each tone actuator there is a connection to a common bus bar 51 through a digital switch. Bus bar 51 may be connected to a source of energizing potential which activates each tone actuator. In a second modification the tone actuators may be activated continuously in which case the common bus bar 51 is connected to an amplifier. It will be readily understood that the tone actuators 50 may be oscillators or pick up devices associated with strings.

The tone actuators 50 may also be solenoids which allow air to reach a rank of pipes in a pipe organ. Tone actuators 50 may in practice be multi-contact relays, each contact activating a separate tone generator or connecting it to an amplifier. Two different ranks of tone generators are usually coupled to the digitals of a particular manual in such a way that the two tone generators actuated by a particular digital have the same pitch; however, they may be connected in such a way that each digital activates a tone generator in a second rank which is an octave or a fifth etc. higher than the simultaneously activated tone generator of the first rank.

A plurality of digital switches 52 are respectively associated with digitals 1 through 29 and respectively closed responsive to depression of the digital, in accordance with conventional practice; such digital-actuated switches are well known in the art and need not be more fully described. A selector switch 54 is provided having a plurality of first contacts 56 and a plurality of second contacts 58. Switch 54 has two positions, one for the uniform or 12 digital keyboard arrangement and the other for the conventiontal or 14 digital keyboard arrangement. It will be seen that switch contacts 56 respectively directly connect digital switches 52 to the tone actuators 50. When selector switch 54 is in its first position, i.e. for selecting the uniform or 12 digital keyboard arrangement, all of the first switch contacts 56 are closed. It will thus be seen that depression of one or more of the digitals 1 through 29 closes the respective digital switch 52 thus in turn energizing the respective tone actuator 50 thereby to provide the uniform keyboard arrangement of digitals of FIG. 2.

It will be seen that the second switch contacts 58 likewise connect the tone actuators 50 to the digital switches 52, but effect the aforesaid conversion of the uniform keyboard arrangement of FIG. 2 to the conventional keyboard arrangement of FIG. 3. Thus, it will be seen that the switch contacts 58 which are respectively connected to the tone actuators for middle C, C♯, D, D♯ and E again respectively connect these tone actuators to the digital switches 52 associated with the digitals 15, 16, 17, 18 and 19. However, the switch contact 58 associated with the tone actuator for E♯ (F in the conventional notation) connects that tone actuator to digital 21 and the switches respectively associated with the tone actuators of F, F♯, G, G♯, A and A♯ (F♯, G♯, A, A♯ and B in the conventional notation) likewise connect these tone actuators to respective digitals one semitone higher than previously, i.e. 22, 23, 24, 25, 26 and 27 respectively rather than 21 through 26 as previously. It will now be clearly seen that with switch 54 in its second position, i.e. for the conventional or 14 digital keyboard arrangement, switch contacts 58 are all closed thereby effecting the reconnection of the tone actuators 50 to the digital switches 52 and it will be clearly seen that in this switch position, the digital switches 52 associated with upper digitals 6, 14, 20 and 28 are not connected to any tone actuator and thus actuation of these digitals would not be accompanied by the production of any musical note.

The digital switches 52, uniform keyboard switches 56 and conventional keyboard switches 58 may be conveniently connected to tone actuators 50 by a workman without musical training, either in modifying an existing instrument to incorporate my invention, or in the manufacture of a new instrument; thus, referring still to FIG. 4, the digital switches 52 and corresponding tone actuators 50, uniform keyboard switches 56, and conventional keyboard switches 58 may be numbered sequentially, in this case from 11 through 39; in FIG. 4, switches 56 are identified by the numerals 11*a* through 39*a* and switches 58 are identified by the numerals 11*b* through 39*b*. It will be seen that the terminals of digital switches 52 are connected in regular succession respectively to one terminal of switches 56, the other terminals of switches 56 being respectively connected to the terminal of corresponding numbered tone generators 50. One terminal of conventional keyboard switches 58 are connected respectively to the terminals of corresponding numbered tone generators. The remaining interconnections 59 between the other terminals of conventional keyboard switches 58 and terminals of uniform switches 56 are made between a switch 58 numbered $(12p+k)$ to a uniform switch numbered $(14p+k+j-4)$ where:

$p$=the octave number from left to right.

$k$=the position of the actuator in the octave starting with 1 for C, 2 for C♯ etc.

$$j=\begin{cases}0 \text{ for } k=1 \text{ to } 5\\ 1 \text{ for } k=6 \text{ to } 12\end{cases}$$

Thus, taking switch 56 numbered 37*a* of FIG. 4, it is seen that $p=3$ and $k=1$, i.e. $(12\times3+1=37)$, and that $j=0$, i.e. $(14\times3+1-4=39)$ and thus that switch 58 numbered 37*b* is connected to switch 56 numbered 39*a*. It will be understood that switch contacts 56 and 58 may be relay contacts instead of directly actuated by switch 54.

When a keyboard instrument has more than one manual, a switch is provided for each manual, so that each manual may be coupled to its respective tone generators so as to employ either twelve or fourteen digitals per octave. A pedal keyboard may be considered simply as an additional manual. Thus, "digital" and "digital switch" may be considered generic terms including pedal and pedal switch respectively.

Normally, all manuals will employ the same switch position. However, in some cases it may be preferable to take advantage of the uniform arrangement for the great manual while retaining the more conventional fourteen digital octave in the swell manual.

Figure 5:
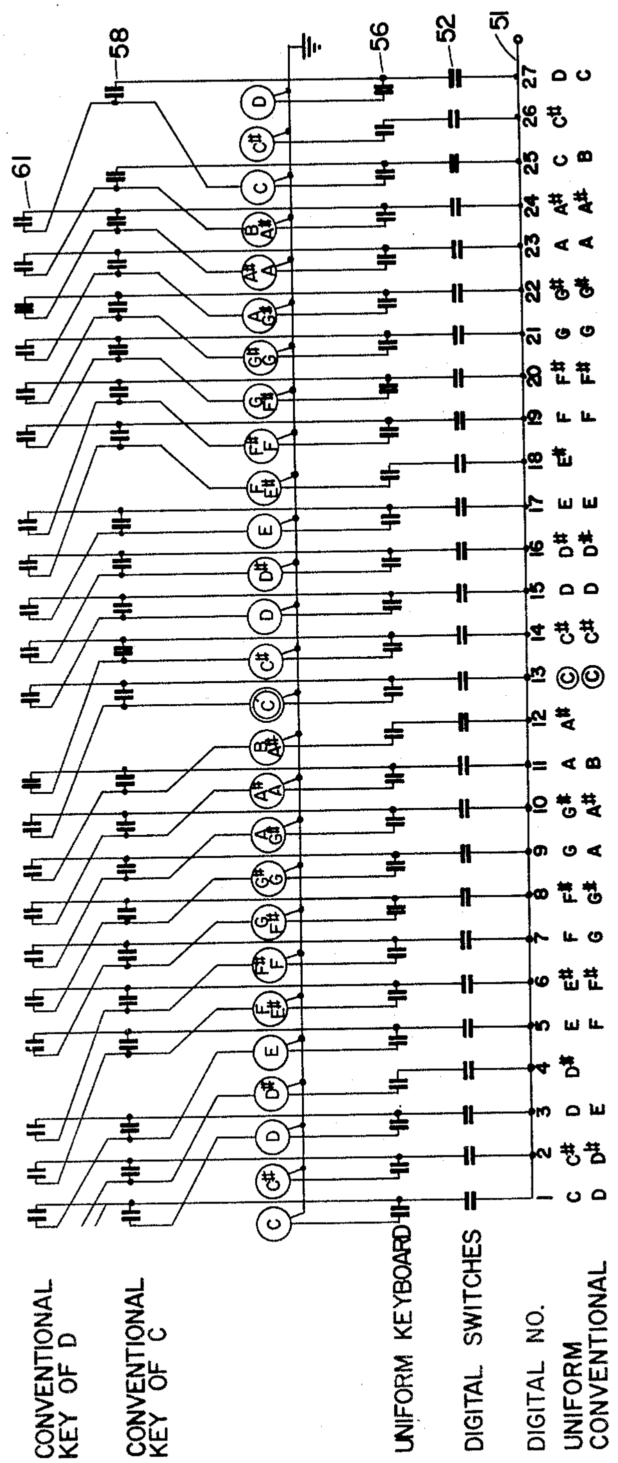
FIG. 5 is an illustration similar to FIG. 4 except that provision is made for converting to the conventional arrangement in two different ways.
Figure 3:
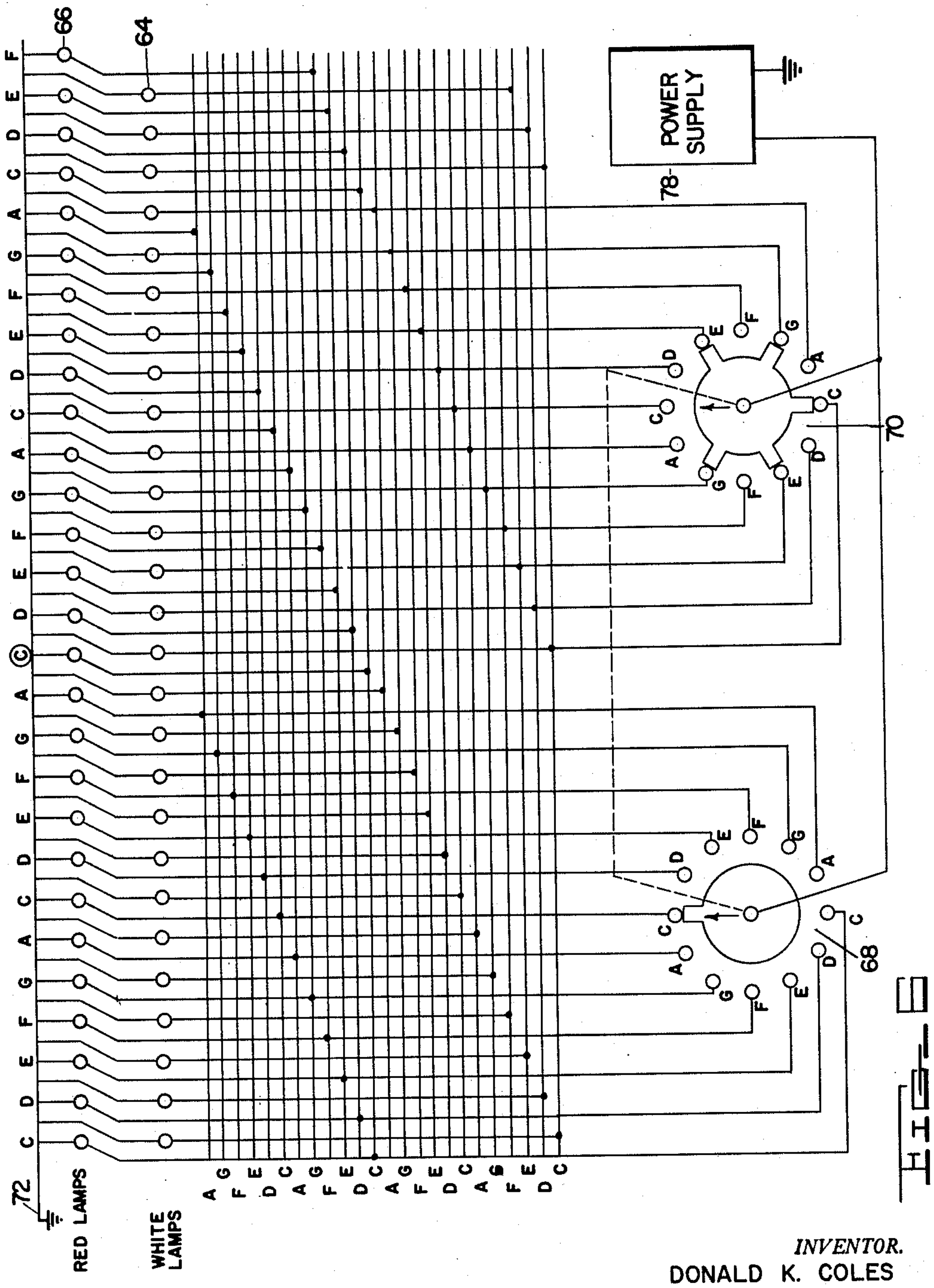

In order to provide for playing in different musical keys with the conventional arrangement, additional switches are provided which connect the digital switches to tone actuators of a higher or lower musical pitch. Referring to FIG. 5 in which like elements are indicated by like reference numerals, first switching means 56 connects the tone actuators 50 to the digital switches 52 in a uniform arrangement. Second switching means 58 connects the tone actuators 50 to the digital switches 52 in a conventional arrangement, with the tone actuator corresponding to the pitch middle C connected to the digital switch corresponding to middle C. A third switching means 61 connects all the respective digital switches 52 to the tone actuators two semitones higher so that digital switch middle C is connected to tone actuator middle D, digital switch D is connected to tone actuator E, and so on.

With my third switching means 61 of FIG. 5 actuated, music written in the key of C may be played in the key of D, and music written in the key of G may be played in the key of A. By the addition of further switch positions, it is possible to transpose music written in any particular key to each of the other eleven musical keys within the equitempered system of twelve semitones to the octave. When the uniform keyboard switching arrangement 56 is added, the switching means thus requires a total of thirteen positions.

Multiple contact switches such as 56, 58 and 61 of FIG. 5 are well known in the pipe organ art, where they are commonly used to connect different ranks of pipes at will to the digital switches, allowing the player choice of quality. These switches may be actuated manually or by solenoids. In the latter case, the appropriate solenoid may be connected to a source of potential by means of a thirteen-position rotary switch or by means of an array of thirteen pushbuttons interconnected so that only one button can be held down at a time. Such arrays of mechanically interconnected pushbuttons are well known, being commonly used in desk calculating machines.

Figure 7:
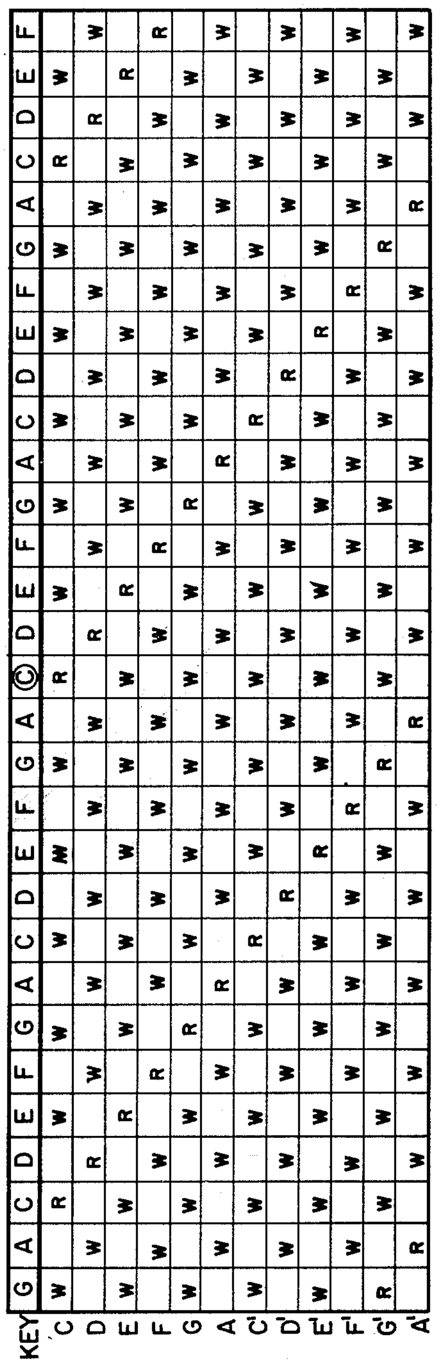
FIG. 7 is a diagram showing the indicator lamps of FIG. 6 which are illuminated for different musical keys.
Figure 8:
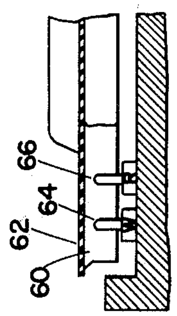
FIG. 8 is a fragmentary cross-sectional view of one digital showing a pair of indicator lamps of FIG. 6 associated therewith.

Referring now to FIGS. 6, 7 and 8; in order to provide a system of movable indicators for assisting the player to orient himself when using the uniform keyboard arrangement of FIG. 2, each lower digital has a hollow portion 60 adjacent its forward end with a transparent or translucent top wall 62. A pair of indicating lamps 64 and 66, which may be white and red respectively, are positioned in the hollow portion 60 of each lower digital so that when these lamps are illuminated, they may be seen through the translucent top wall 62. A pair of 12 position selector switches 68 and 70 are provided, these switches being ganged, as shown. Through a matrix system and a ground connection 72, switch 68 selectively energizes the red lamps 66 and switch 70 selectively energizes the white lamps 64.

Referring now to FIG. 7 and music written in the key of C; when the music being played is centered around middle C, I desire to illuminate the red lamp associated with the digital corresponding to middle C, the red lamps respectively associated with the digitals of C two octaves above and below middle C, respectively and the white lamps respectively associated with alternate lower digitals beginning with middle C, i.e. all lower digitals associated with E and G and the digitals associated with C one octave below and one octave above middle C. Inspection of the circuit of FIG. 6 will reveal that with switches 68 and 70 in the position shown, i.e. C, the digitals will be so illuminated. In accordance with the system of my invention, this same digital illumination as shown in the top line of FIG. 7 for the key of C would be employed for music in the key of C♯. Further, for transposing music to the key of D (or D♯), I desire to illuminate the red lamp associated with the lower digital corresponding to D immediately above middle C, respectively, and the red lamps respectively associated with the lower digitals corresponding to D two octaves above and below middle C, again the white lamps respectively associated with alternate digitals starting from D immediately above middle C; i.e. F, A, and the D one octave above and below the D immediately above middle C respectively. The same arrangement prevails for music transposed to the key of E, F, G and A (or E♯, F♯, G♯ or A♯ as the case may be) as clearly shown in FIG. 7, and inspection of the diagram of FIG. 6 will reveal that as the switches 68 and 70 are selectively moved to positions D, E, F, G, or A, the white and red lamps 64 and 66 will be illuminated as shown in the lines identified D, E, F, G, and A in FIG. 7.

The arrangement thus far described may in many instances be adequate in which case switches 68 and 70 need only have six positions, i.e. those identified as C, D, E, F, G, and A respectively. However, if the music being played is centered around a base note an octave above or an octave below middle C, it is desirable to provide additional switch positions respectively identified as C′ through A′ which selectively illuminate the white and red lamps 64 and 66 as shown in lines C′ through A′ in FIG. 7.

It will be understood that lamps 64 and 66 of FIG. 6 need not be positioned beneath the respective digitals; each lamp may equally well indicate or illuminate its associated digital from a position above and behind that digital.

It will be seen that the lamps 64 and 66 are respectively connected to ground 72 whereas the rotors 74 and 76 of switches 68 and 70 are connected to one end of power supply 78, the other side of power supply 78 likewise being connected to ground to complete the circuit. The power supply 78 may be any source of energizing potential such as 12 volts D.C.

Figure 9:
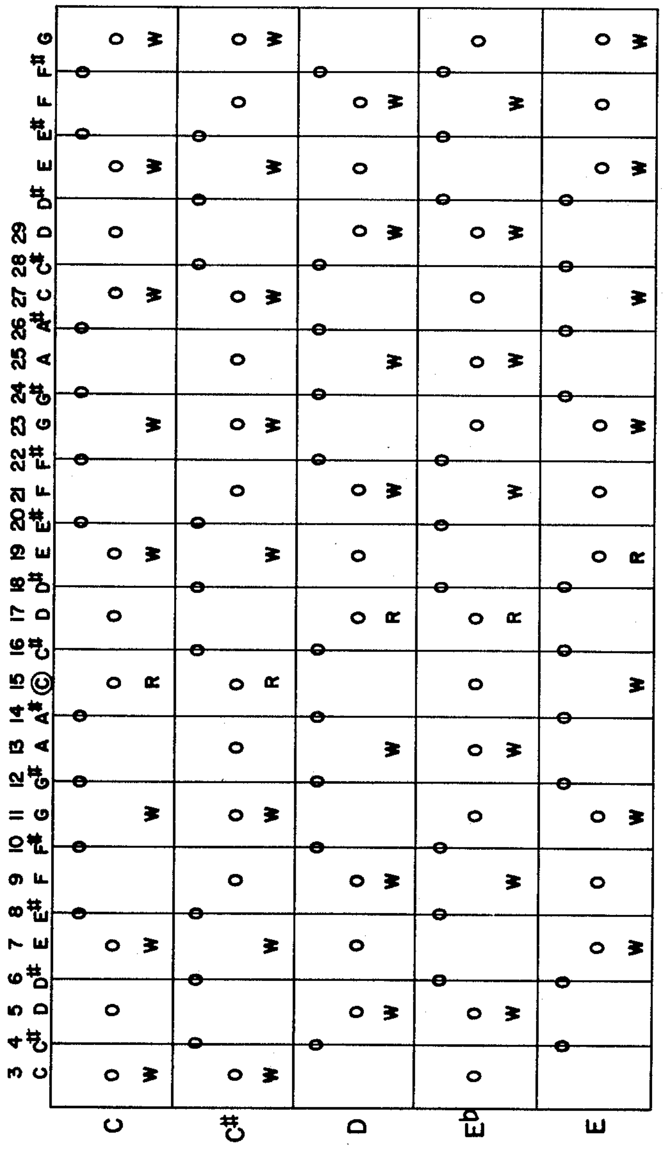
FIG. 9 is a chart useful in explaining the embodiment of FIG. 6.

Referring now briefly to FIG. 9, it will be seen that when the uniform keyboard arrangement of FIG. 2 has been selected by selector switch 54 of FIG. 4, and with the selector switches 68 and 70 of FIG. 6 in the position "C," the diatonic scale for the key of C is played on lower digitals 3, 5, 7, upper digitals 8, 10, 12, 14, lower digitals 15, 17, 19, upper digitals 20, 22, 24, 26 and so on with digital 15 corresponding to middle C being illuminated by a red lamp 66 and with lower digitals 3, 7, 11, 19, 23, 27 and so on illuminated by white lamps 64. It will be seen that in the case of C♯ the same lamps are illuminated as in the case of the key of C, however, the diatonic scale is now played on upper digitals 3, 6, 8, lower digitals 9, 11, 13 and 15, upper digitals 16, 18, 20, lower digitals 21, 23, 25 and 27 and so on. In the key of D, the red lamp 66 associated with lower digital 17 is illuminated, the white lamps associated with lower digitals 5, 9, 13, 21, 25 and 29 and so on are illuminated and the diatonic scale is played on lower digitals 5, 7, 9, upper digitals 10, 12, 14, 16, lower digitals 17, 19, 21, upper digitals 22, 24, 26, 28 and so on.

Figure 10:
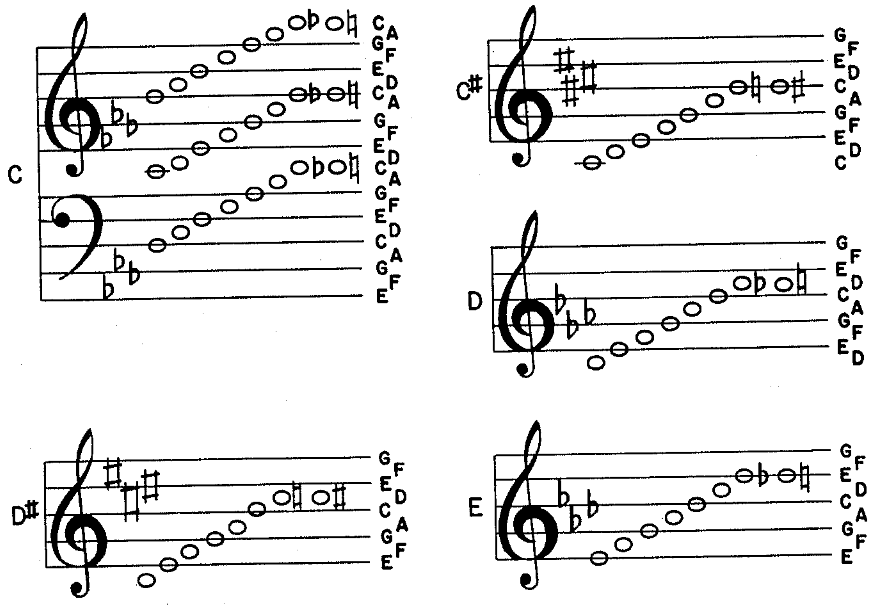
FIG. 10 is a chart illustrating a method of musical notation which may be employed with the uniform keyboard arrangement of FIG. 2.

Referring now to FIG. 10 a simplified system of musical notation for use with the uniform keyboard arrangement of FIG. 2 will be explained. Referring to FIG. 10*c* which shows the diatonic scale for the key of C in the bass and treble clefs centered on middle C, I indicate the notation of three flats for a reason which will immediately become apparent. Thus, the first three notes, middle C, D, and E clearly indicate that the lower or white digitals are to be played upon. In the case of the next three notes respectively positioned in the lines and spaces of F, G, A, the upper or black digitals of F♭, G♭ and A♭ are to be played upon and thus the three flat signature. Following this, the next note on the C line is shown as flatted to provide the note C♭ or A♯ as the case may be, and in the particular case of the diatonic scale shown, the C above middle C is shown with the natural sign since it immediately follows the C♭ sign. However, in all cases except that shown, i.e. the C above middle C being immediately preceded by C♭, the note would be shown in its natural form. Inspection of the scales shown for C♯, D, D♯ and E, will immediately reveal that the same type of signature is employed for every key thus greatly simplifying the over all system of musical notation.

It will be recognized that the uniform keyboard of FIG. 2 and my accompanying system of musical notation is slightly more difficult in the case of the key of C, however, it is simpler in all of the other keys.

This type of notation is satisfactory for playing much of modern music which is written without showing the positions of all notes of a chord. In this type of written music, a musical shorthand is used which denotes a complete chord by one symbol as shown in colnmn 2 of Table I. This method of writing music for the uniform keyboard has the advantage of being very similar to that with the conventional keyboard with exactly the conventional correspondence between the lower and upper digitals of a keyboard and notes written on five line bass and treble clefs centered on middle C. As far as the playing of written notes is concerned, the player accustomed to conventionally written music need not take into account the changed labels of the digitals nor the fact that an octave now spans three spaces instead of three and one half spaces. He will have learned to play with thirteen different signatures; to play my uniform keyboard requires only two more.

Figure 11:
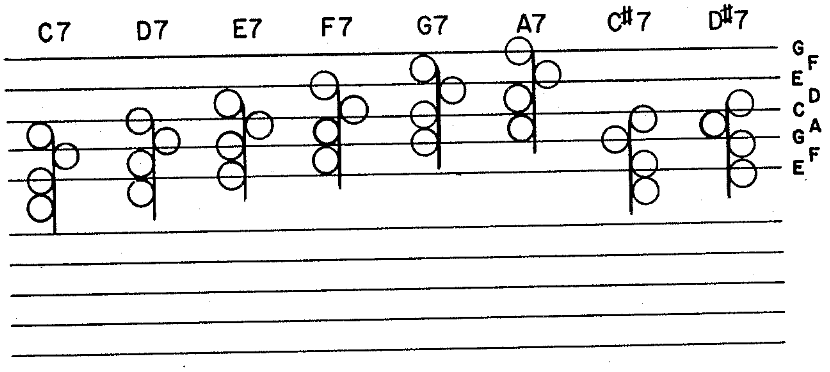
FIG. 11 is a chart illustrating another method of musical notation which may be used with the uniform keyboard of FIG. 2.

The use of a key signature, however, destroys an important property which is characteristic of my uniform keyboard, namely, the proportionality between spacing and musical interval. In order to maintain this property in the written music, and to establish a close correspondence with the keyboard, I use preferably an improved notation without key signature. Referring to FIG. 11, a typical group of notes, namely, the major seventh chord, is written with eight different root tones. Standard elliptical or circular notes centered on lines and spaces are used to indicate the six lower digitals, while an upper digital is represented by the same type of note centered on the upper or lower half of a space, as shown. With this method of writing the major chords on C, D, E, F, G, A, the group of four notes moves as a rigid figure up the clef, just as the player's hand should move rigidly up the keyboard when playing these six chords. Similarly, the group of three notes denoting the the major chords on C♯, D♯, F♯, F♯, G♯, A♯ moves up the clef as a rigid figure. Thus, this type of notation has the advantage over the conventional notation that chords and sequences of tones are represented by fewer configurations in the written music and the structure of a chord configuration in the written music more closely resembles the structure of the chord on the keyboard.

A second advantage of the notation of FIG. 10 or FIG. 11 is that the lettering of the five lines of the lower clef is identical with the lettering of the five lines in the upper clef. A third advantage of the notation is that the relationship of letters to the lines and spaces repeats itself every octave rather than every two octaves.

Inspection of FIG. 10 will immediately reveal the reason for the particular system of movable indicator lamps described above and illustrated in FIGS. 6, 7 and 9. Thus, referring to FIG. 10*c*, it will be recognized that middle C is illuminated with a red lamp and that the digitals corresponding to E, G, C, E, G, C, successively above middle C and G, E, C, G, E successively below middle C are illuminated by white lamps thus corresponding to the five lines respectively in the bass and treble clef. It will now further be revealed that the system of movable indicators greatly facilitates transposition between one key and another. For example, if the music is written in the key of C and it is desired to play it in the key of D, the switches 68 and 70 are positioned at D and the music played as written. By virtue of the uniform keyboard arrangement of FIG. 2, the fingering of all chords in the key of D is identical to that for the key of C and thus the music written in the key of C is immediately and in essence automatically transposed to the key of D without any mental effort on the part of the player.

Figure 12:
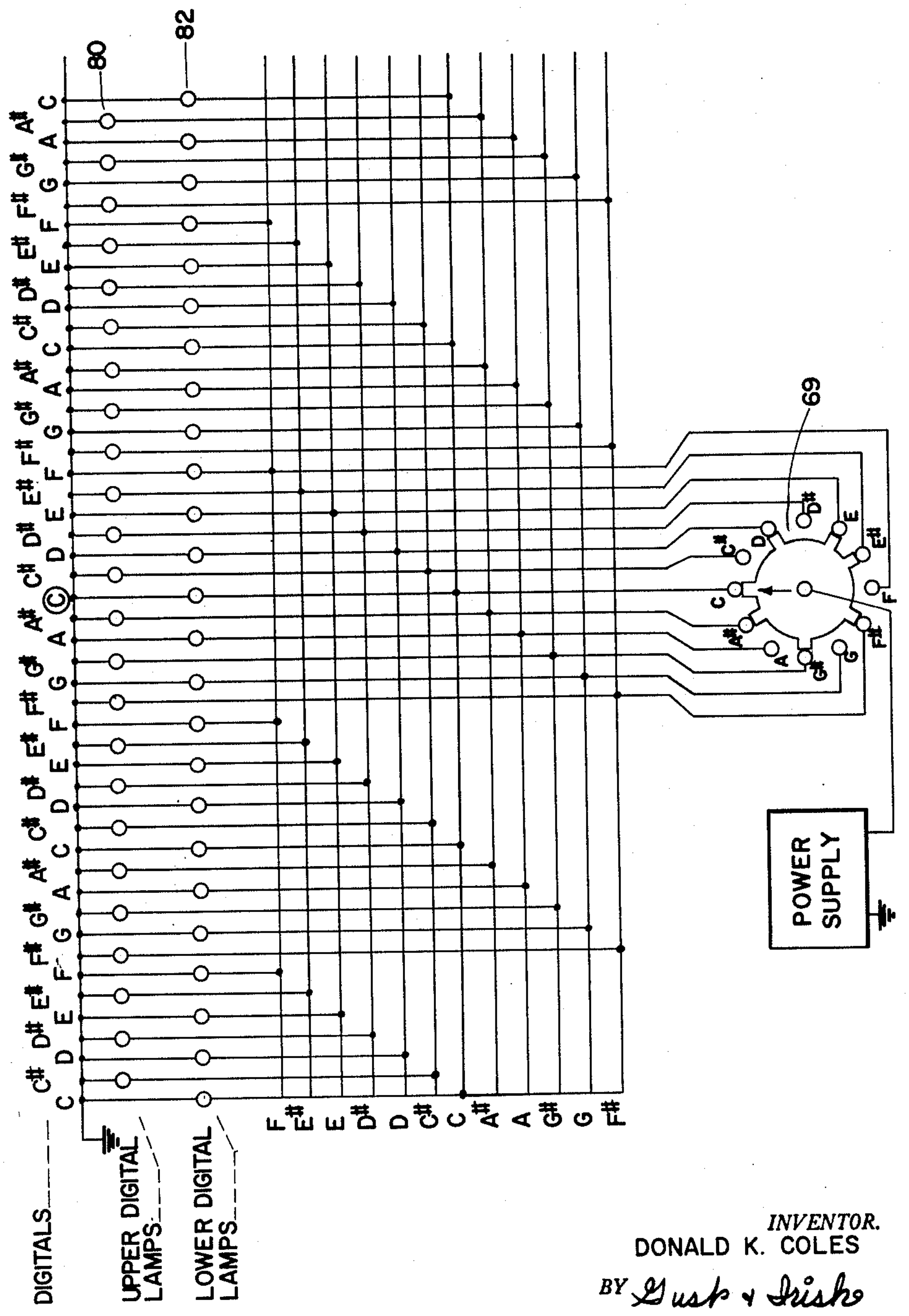
FIG. 12 is a diagram showing another arrangement of indicator lamps employed with my invention.

Referring to FIG. 12, lamps 80 and 82 may be positioned so that they respectively illuminate both upper and lower digitals in the uniform keyboard arrangement. In this case the set of lower and upper digitals corresponding to the hexachord or the diatonic scale on a particular keynote may be illuminated. Switch 69 has twelve positions corresponding to the twelve different musical keys. When positioned for a particular key, switch 69 illuminates the lamps associated with those seven digitals corresponding to the diatonic scale of that key, as shown in FIG. 9. Thus, when switch 69 of FIG. 12 is turned to the position C, the lamps 80 and 82 associated with diatonic digitals C, D, E, E♯, F♯, G♯, A♯ (uniform notation) are illuminated. When turned to position F♯, which corresponds to a keynote higher by an interval of a fifth, the lamps associated with digitals F♯, G♯, A♯, C, D, E, F (uniform notation) illuminated, which are the diatonic digitals in the key of F♯. For greater speed of control, I preferably employ in lieu of a rotary switch an array of twelve pushbuttons so interconnected mechanically that depression of one pushbutton releases all others. Such arrays are well known.

Figure 13:
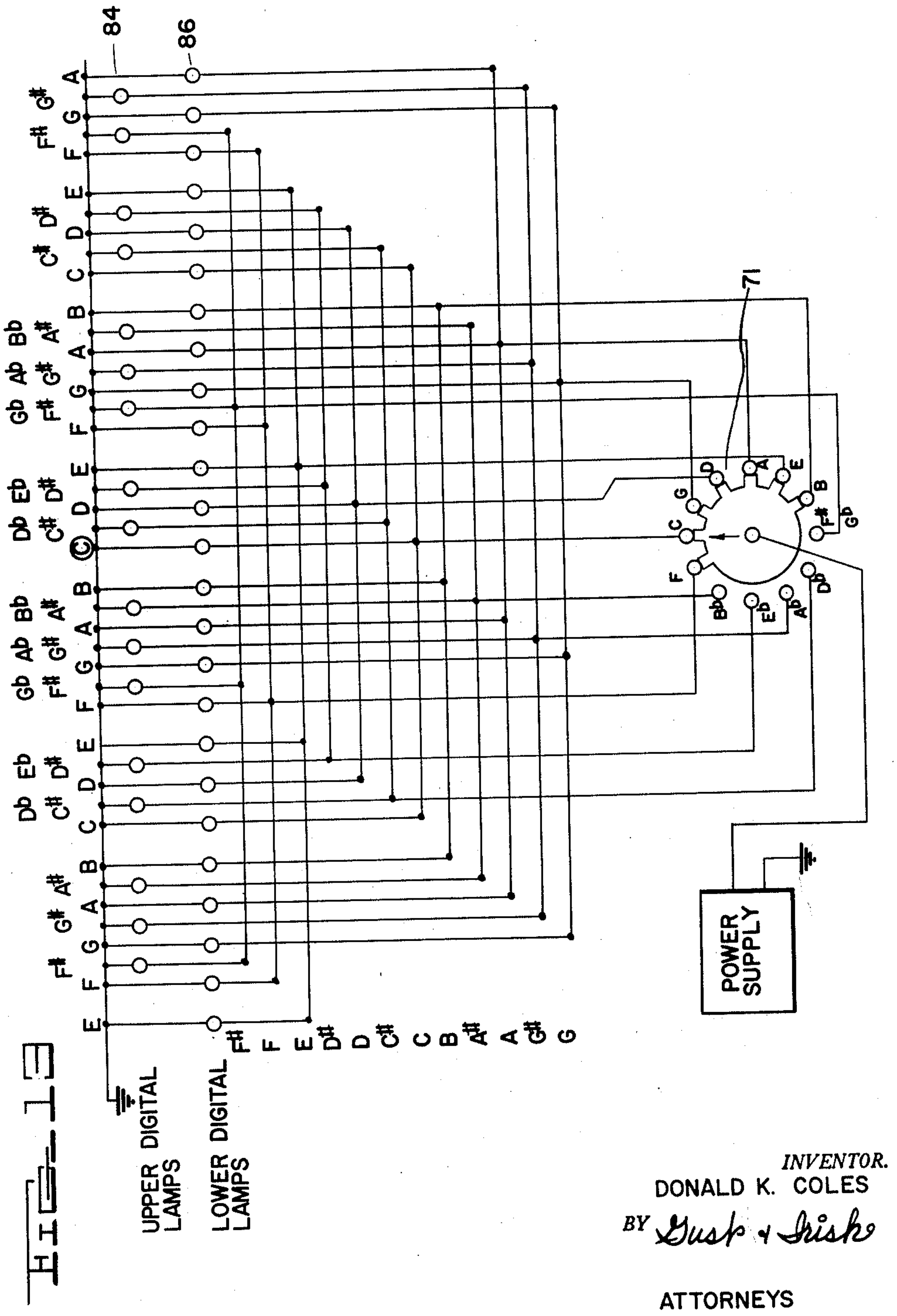
FIG. 13 is a diagram showing still another arrangement of indicator lamps employed with my invention.
Figure 14:
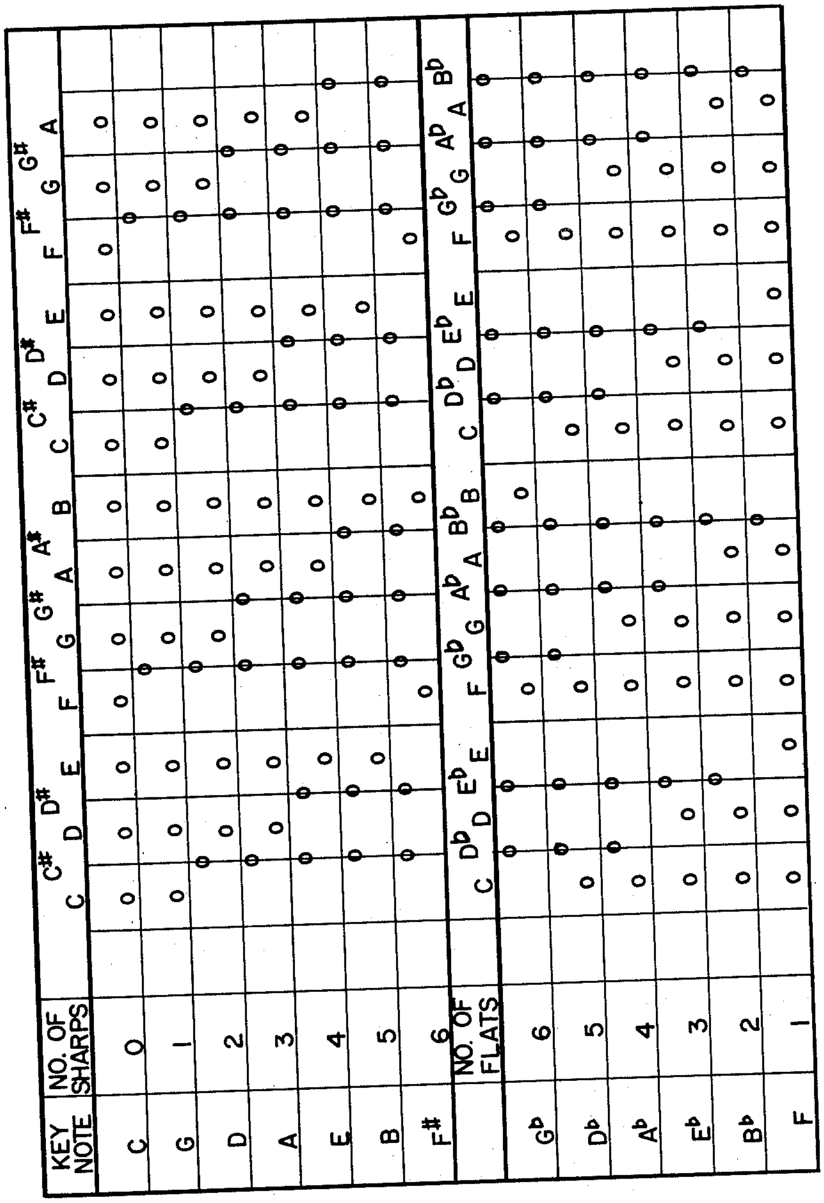
FIG. 14 is a chart useful in explaining the embodiment of FIG. 13.

When the two position switch of FIG. 4 is positioned so that the conventional arrangement of digitals is employed, the switch 69 of FIG. 12 may be disconnected and a different set of indicator lights with a twelve position switch employed to illuminate the diatonic digitals of the conventional keyboard arrangement in the musical key to be played. Referring to FIG. 13, switch 71 having twelve positions corresponding to twelve different musical keys, energizes lamps 84 and 86 illuminating the appropriate diatonic digitals for each key. Referring to FIG. 14, the diatonic digitals for each musical key are indicated by small circles. Thus, when switch 71 of FIG. 13 is turned to the position C it connects a source of electric potential to the lamps 86 associated respectively with the seven lower digitals C, D, E, F, G, A, B, C. When turned to position G, switch 71 connects the source of potential to the lamps 86 associated respectively with the six lower digitals G, A, B, C, D, E, and the lamp 84 associated with the single upper digital F♯. FIG. 13 and FIG. 14 show the twelve musical keys arranged in the progression of fifths, from C to G, G to D, etc. since in this progression the number of sharps increases regularly from one to six, and then the number of flats decreases regularly from six to one. The keys of F♯ and G♭ are shown separately in FIG. 14, but they occupy the same position on switch 71 in FIG. 13.

The use of switch 71, FIG. 13 serves a double purpose. It provides necessary landmarks on a keyboard having uniformly arranged lower and upper digitals, but connected in the conventional arrangement, and at the same time it serves as a reminder of the key signature to unpracticed players reading conventional music.

The uniform keyboard instrument with the digitals connected in the conventional arrangement and with movable indicators can provide further assistance to unpracticed players reading conventional music, for it is possible with my invention to play conventional music in any key entirely on the seven lower digitals except for accidental notes. Thus, for example, simple music without accidentals written conventionally in the key of D may be played in the key of D, but without regard to the key signature which calls for F♯ and C♯. Instead, digitals F and C are actuated, as will be explained.

Referring to FIG. 14 it is seen that the diatonic scale of D is ordinarily played with the digitals D, E, F♯, G, A, B, C♯, D, whereas the diatonic scale on C is played entirely on the lower digitals C, D, E, F, G, A, B, C. Hence, the first step in avoiding the use of upper digitals is to move the indicator switch 70 of FIG. 6 one lower digital to the left, which corresponds to position A on this switch. This has the effect that the player will interpret the symbols D, E, F, G, A, B, C, in the written music as to be played on digitals C, D, E, F, G, A, B respectively. That is, the player actually strikes the diatonic digitals of the key of C where the tones mi and ti of the diatonic scale are played on lower digitals rather than upper digitals. The next step, to play in the key of D as intended, is to use a transposing switch to transpose up two semitones so that the digital C is coupled to tone actuator D. A switch which transposes up two semitones is shown in FIG. 5 hereof, where opening of switch bank 58 and closing of switch bank 61 connects digital C to tone actuator D, digital C♯ to tone actuator D♯, and so on. The result of this double transposition is that the music may now be played in the key of D as written, but without use of upper digitals except for accidental notes. Referring to Table III, the double transpositions required to eliminate upper digitals from the diatonic scale are shown for all keys other than C. The downward transposition of digitals is shown for all keys other than C. The downward transposition of digitals is shown in column 2 and the upward transposition of tone actuators is shown in column 3.

*Table III*

| Keynote | Number of Lower Digitals Transposed Down | Number of Semitones Transposed Up |
|---|---|---|
| D | 1 | 2 |
| E | 2 | 4 |
| F | 3 | 5 |
| G | 4 | 7 |
| A | 5 | 9 |
| B | 6 | 11 |
| D♭ | 1 | 1 |
| E♭ | 2 | 3 |
| F♯ | 3 | 6 |
| G♭ | 4 | 6 |
| A♭ | 5 | 8 |
| B♭ | 6 | 10 |

Accidental sharps or flats are played as written. When the key signature is written in sharps, naturalized notes are played by depressing the adjacent upper digital to the left. When the key signature is written in flats, then naturalized notes are played by depressing the adjacent upper digital to the right. Thus, in music written for the key of G, naturalized notes F or C, written F♮, or C♮ are played on upper digitals, labeled F♯ and C♯ in FIG. 3. Thus, with my invention conventional music becomes easier to play.

The method I have described for accomplishing assistance to unpracticed players has the advantage over the prior methods in that a means is also provided for transposing to other keys. Referring again to Table III, it is seen that by transposing upward four semitones instead of two as heretofore, the music is transposed from D to E, while by transposing upward only one semitone instead of two, the music is transposed from the key of D to D♭.

Analysis of this result shows that an essential element of the first type of transposition is that it operates on the array of lower digitals as one subgroup and separately on the array of upper digitals as a separate subgroup. The transposition may be accomplished electrically in the connections to these two arrays. Thus, the same type of transposing switch may be used for the first transposition as for the second. The important difference is that the second transposer must operate on the group of tone generators, while the first transposer must operate on the group of digitals. The distinction may be made clear by reference to the transposing operation of FIG. 5. Referring to FIG. 5, in opening switch bank 58 and closing switch bank 61, fixed transposition of two semitones is performed on tone actuators 50, but a varying shift of two to three digitals is performed with respect to digital switches 52, considered as a single group.

It will now be readily apparent that I have provided a keyboard type instrument incorporating a uniform keyboard with features which eliminate the previous objections to such a keyboard, i.e., a system of movable indicators for orienting the player upon the keyboard, and a system for ready conversion of the uniform keyboard to a keyboard closely simulating the conventional keyboard.

It will also be seen that my improved keyboard musical instrument may be obtained by modification of existing musical instruments or by completely new construction.

While I have illustrated and described specific embodiments of my invention, further modifications and improvements will occur to those skilled in the art and I desire therefore in the appended claims to cover all modifications which do not depart from the spirit and scope of my invention.

What is claimed is:

1. A musical instrument comprising: a continuous keyboard having a plurality of manually actuated alternately disposed upper and lower digitals, a plurality of tone actuator means respectively arranged to provide a continuous sequence of tones having pitches proceeding from low to high in an approximately equitempered scale forming at least one octave of twelve semitones; and switching means having at least first and second positions; said switching means in said first position thereof respectively coupling successive ones of said digitals to successively higher pitched one of said tone actuator means for actuating the same thereby to provide a uniform keyboard arrangement having twelve alternating upper and lower digitals per octave and with each successive lower and upper digital actuating a respective tone actuator means of successively higher pitch; said switching means in said second position thereof respectively coupling successive ones of said lower digitals to successively higher pitched ones of said tone actuator means and preselected successive ones of said upper digitals to other successively higher pitched ones of said tone actuator means in a successive pattern of first groups of two adjacent upper digitals and second groups of three adjacent upper digitals spaced from the adjacent first groups by one intermediate upper digital, said intermediate upper digitals being decoupled from said tone generator means in said second position of said switching means thereby to provide a conventional keyboard arrangement with fourteen alternating lower and upper digitals per octave and with each successive lower digital and upper digital of said first and second groups actuating a respective tone actuator means of successively higher pitch.

2. A musical instrument comprising: continuous keyboard having a plurality of manually actuated alternately disposed upper and lower digitals; a plurality of tone actuator means respectively arranged to provide a continuous sequence of tones having pitches proceeding from low to high in an approximately equitempered scale forming at least one octave of twelve semitones; and switching means having at least first and second positions, all of said digitals and said tone actuator means being coupled to said switching means; said switching means in said first position thereof respectively coupling successive ones of said digitals to successively higher pitched ones of said tone actuator means for actuating the same thereby to provide a uniform keyboard arrangement having twelve alternating lower and upper digitals per octave and with each successive lower and upper digital actuating a respective tone actuator means of successively higher pitch; said switching means in said second position thereof coupling successive ones of said lower digitals to respective tone actuator means having successive higher diatonic pitches in the key of "C" and preseletced successive ones of said upper digitals to other respective tone actuator means having successively higher accidental pitches in the key of "C" in a successive pattern of first groups of two adjacent upper digitals and second groups of three adjacent upper digitals spaced from the adjacent first groups by one intermediate upper digital, said intermediate upper digitals being decoupled from said tone actuator means thereby to provide a conventional keyboard arrangement with each successive lower digital and upper digital of said first and second groups actuating a respective tone actuator means of successively higher pitch, there being a total of fourteen alternating lower and upper digitals per octave.

3. A musical instrument comprising: a continuous keyboard having a plurality of manually actuated alternate upper and lower digitals, a plurality of tone actuator means respectively arranged to provide a continuous sequence of tones having pitches proceeding from low to high in an approximately equitempered scale forming at least one octave of twelve semitones; switching means having at least first, second and third positions, all of said digitals and said tone actuator means being coupled to said switching means; said switching means in said first position thereof respectively coupling successive ones of said digitals to successively higher pitched ones of said tone actuator means for actuating the same thereby to provide a uniform keyboard arrangement having twelve alternate lower and upper digitals per octave, and with each successive lower and upper digital activating a respective tone actuator means of successively higher pitch; said switching means in said second position thereof respectively coupling successive ones of said lower digitals to respective tone actuator means having successively higher diatonic pitches in the key of "C" and preselected successive ones of said upper digitals to other respective tone actuator means having successively higher accidental pitches in the key of "C" in a successive pattern of first groups of three adjacent upper digitals spaced from the adjacent first groups by one intermediate upper digital, said switching means in said third position thereof respectively coupling successive ones of said lower digitals to respective tone actuator means having successively higher diatonic pitches in a particular key other than "C" and preselected successive ones of said upper digitals to other respective tone actuator means having successively higher accidental pitches in said particular key in a successive pattern of first groups of two adjacent upper digitals and second groups of three adjacent upper digitals spaced from the first groups by one intermediate digital, said intermediate upper digitals in said second and third positions of said switching means being decoupled from said tone actuator means thereby to provide a conventional keyboard arrangement of twelve active upper and lower digitals with a total of fourteen alternating lower and upper digitals per octave.

4. A musical instrument comprising: a continuous keyboard having a plurality of manually actuated alternately disposed upper and lower digitals, a first plurality of electrical switches respectively associated with said digitals and actuated thereby; a plurality of tone actuators respectively arranged to provide a continuous sequence of tones having pitches proceeding from low to high in an approximately equitempered scale forming a plurality of octaves of semitones, one of said tone generators providing the pitch of middle "C," the remaining tone generators providing at least one octave above and below middle "C" respectively; a second plurality of electrical switches respectively coupling successive ones of said first plurality of switches to successively higher pitched ones of said tone generators; means for simultaneously actuating all of said second plurality of switches whereby actuation of a digital and the respective switch of said first plurality of switches couples the respective tone generator to a source of energizing potential thereby providing a uniform keyboard arrangement having twelve alternate lower and upper digitals per octave and with each successive lower and upper digital actuating a respective tone generator of successively higher pitch; and a third plurality of electrical switches respectively coupling each of the first plurality of switches associated with each successive one of said lower digitals to a respective tone generator having a successively high diatonic pitch in the key of "C," and respectively coupling the switches of said first plurality associated with preselected successive ones of said upper digitals to other respective tone actuators having successively higher accidental pitches in the key of "C," said preselected upper digitals having a successive pattern of first groups of two adjacent upper digitals and second groups of three adjacent upper digitals spaced from the adjacent first groups by one intermediate upper digital, said switches of said second plurality decoupling the switches of said first plurality associated with said intermediate upper digitals from said tone generators, and means for simultaneously actuating all of said third plurality of switches whereby actuation of a digital and the respective switch of said first plurality of switches couples the respective tone generator to a source of energizing potential thereby providing a conventional keyboard arrangement with each successive lower digital and upper digital of said first and second groups actuating a respective tone generator of successively higher pitch, there being a total of fourteen alternating lower and upper digitals per octave, one of said second plurality of switches and one of said third plurality of switches respectively coupling said one tone generator to the same switch of said first plurality for actuation by the same lower digital whereby said last named lower digital always corresponds to the pitch of middle "C."

5. A musical instrument comprising: a continuous keyboard having a plurality of manually actuated alternate upper and lower digitals, a plurality of tone actuator means respectively arranged to provide a continuous sequence of tones having pitches proceeding from low to high in an approximately equitempered scale forming at least one octave of twelve semitones; switching means respectively coupling successive ones of said digitals to successively higher pitched ones of said tone actuator means for actuating the same thereby to provide a uniform keyboard arrangement with each successive lower and upper digital actuating a respective tone actuator means of successively higher pitch; a plurality of illuminating means respectively associated with predetermined ones of said digitals; and means for selectively actuating predetermined groups of said illuminating means thereby indicating at least some of the digitals which are normally played upon in corresponding predetermined musical keys.

6. The combination of claim 5 wherein said illuminating means are respectively associated with each of said lower digitals only; and wherein said actuating means comprises means for selectively actuating a first group of said illuminating means comprising a predetermined fixed pattern of illuminating means, and a second group of said illuminating means comprising the remaining illuminating means having the same pattern as said first group.

7. The combination of claim 5 wherein said illuminating means comprises first and second illuminating means respectively associated with each of said lower digitals only and wherein said actuating means comprises means having a plurality of positions for selectively actuating a different predetermined one of said first illuminating means in each position thereof, and means for selectively actuating groups of said second illuminating means associated respectively with the lower digitals spaced from the lower digital associated with the said one first illuminating means which is actuated and from each other by one lower digital.

8. A musical instrument comprising: a continuous keyboard having a plurality of manually actuated alternate upper and lower digitals, a plurality of tone actuator means respectively arranged to provide a continuous sequence of tones having pitches proceeding from low to high in an approximately equitempered scale forming at least one octave of twelve semitones; switching means respectively coupling successive ones of said digitals to successively higher pitched ones of said tone actuator means for actuating the same thereby to provide a uniform keyboard arrangement having twelve alternating lower and upper digitals per octave and with each successive lower and upper digital actuating a respective tone actuator means of successively higher pitch; a plurality of first and second indicator lamps respectively associated with each of said lower digitals; first switching means having at least four positions, said first switching means in each position thereof coupling a predetermined different one of said first lamps to a source of energizing potential, said predetermined first lamps being respectively associated with adjacent lower digitals; and second switching means having at least two positions, said second switching means in each position thereof coupling to a source of energizing potential a group of said second lamps respectively associated with the lower digitals which are spaced by one lower digital from each other and from the lower digital associated with the said one predetermined first lamp.

9. A musical instrument comprising: a continuous keyboard having a plurality of manually actuated alternately disposed upper and lower digitals, a plurality of electrical switches respectively associated with said digitals and actuated thereby; a plurality of tone actuators respectively arranged to provide a continuous sequence of tones having pitches proceeding from low to high in an approximately equitempered scale forming a plurality of octaves of semitones, one of said tone actuators providing the pitch of middle "C," the remaining tone generators providing at least one octave above and below middle "C" respectively; said plurality of switches respectively coupling each of said tone actuators to a source of energizing potential whereby actuation of a digital couples the respective tone actuator to a source of energizing potential thereby providing a uniform keyboard arrangement having twelve alternating lower and upper digitals per octave and with each successive lower and upper digital actuating a respective tone actuator of successively higher pitch; a plurality of first and second indicator lamps respectively associated with each of said lower digitals; first switching means having at least four positions, said first switching means in each position thereof coupling a predetermined different one of said first lamps to a source of energizing potential, said predetermined first lamps being respectively associated with adjacent lower digitals one of which is said lower digital corresponding to middle "C," said first switching means in each position thereof further coupling the first lamps respectively spaced from the said one predetermined first lamp by two octaves; and second switching means having at least two positions, said second switching means being operatively coupled to said first switching means, said second switching means in each position thereof coupling to a source of energizing potential a group of said second lamps respectively associated with the lower digitals which are spaced by one lower digital from each other and from the lower digital associated with the said one predetermined first lamp.

10. The combination of claim 9 wherein said first switching means has twelve positions in first and second groups of six, said first switching means in each position of said first group of positions coupling a predetermined different one of a first group of said first lamps to a source of energizing potential, said predetermined first group of lamps being respectively associated with adjacent lower digitals one of which is said lower digital corresponding to middle "C," said first switching means in each position of said second group of positions coupling a predetermined different one of a second group of said first lamps to a source of energizing potential, said second group of first lamps being respectively spaced from said first group of first lamps by one octave, said first switching means in each position thereof further coupling to a source of energizing potential the first lamps respectively spaced from said one predetermined first lamp by two octaves; and wherein said second switching means has twelve positions and is operatively coupled to said first switching means, said second switching means in each position thereof coupling to a source of energizing potential a group of said second lamps respectively associated with the lower digitals which are spaced by one lower digital from each other and from the lower digital associated with said one predetermined first lamp.

11. A musical instrument comprising: a continuous keyboard having a plurality of at least 30 manually actuated alternately disposed upper and lower digitals, a plurality of tone actuator means arranged to provide a continuous sequence of tones having pitches proceeding from low to high in an approximately equitempered scale forming a plurality of octaves; digital switching means respectively coupling said digitals to said tone actuator means for actuating the same; a plurality of illuminating means respectively associated with predetermined ones of said digitals in each octave; and means for selectively actuating predetermined groups of said illuminating means, said predetermined groups each constituting a geometrical pattern which repeats itself at least once every two octaves.

12. A musical instrument comprising: a continuous keyboard having a plurality of at least thirty manually actuated alternately disposed upper and lower digitals, a plurality of tone actuator means respectively arranged to provide a continuous sequence of tones having pitches proceeding from low to high in an approximately equitempered scale; switching means respectively coupling said digitals to said tone actuator means for actuating the same; a plurality of illuminating means respectively associated with predetermined ones of said digitals; and means for selectively actuating predetermined groups of said illuminating means, said predetermined groups forming identical geometrical patterns which are repeated at least once every two octaves.

13. In a musical instrument having a uniform keyboard consisting of alternating upper and lower digitals arranged in a geometrical pattern which repeats itself seven times per octave, and a plurality of tone actuators respectively coupled to said digitals and actuated thereby; means for playing conventionally written music as written in any key on the lower digitals alone except for accidental notes comprising; first means for transposing all of said tone actuators by a first predetermined number of semitones; and second means for transposing said lower digitals by a second predetermined number of digitals and said upper digitals by said second predetermined number of digitals.

14. The combination of claim 13 wherein the said second transposing means comprises a plurality of movable illuminating means respectively associated with predetermined ones of said digitals and means for moving said illuminating means along the length of the keyboard by a said second predetermined number of digitals.

15. The combination of claim 13 wherein the said second transposing means comprises a plurality of indicator lamps respectively associated with predetermined ones of said digitals, and switching means for selectively coupling predetermined groups of said lamps to a source of energizing potential, said predetermined groups forming identical geometrical patterns, but displaced different distances along the length of said keyboard.

16. A movable landmark system for a uniform keyboard having a plurality of digitals forming a plurality of octaves comprising indicator lamps, each of said lamps being positioned to illuminate one of the digitals of the keyboard; a switch with at least six positions and six output terminals; electrical connections between said lamps and said output terminals of said switch, said electrical connections connecting each of said output terminals of said switch to at least one lamp per octave of the keyboard; said switch in each position thereof actuating predetermined ones of said lamps in each position in a geomertical pattern which repeats itself at least once every octave.

17. Means for indicating certain digitals in each octave of a musical keyboard depending on the key in which music is to be played comprising a plurality of linearly disposed evenly spaced lamp sockets; switching means having at least six positions and six output terminals; electrical connections between each output terminal of said switching means and each of a preselected group of said sockets, each of said preselected group of lamp sockets constituting a geometrical pattern which repeats itself at periodic intervals; the number of said intersocket spacings in said periodic interval being a multiple of six.

18. In a musical instrument having a keyboard formed of a plurality of alternately disposed upper and lower digitals, and a plurality of tone actuator means providing a continuous sequence of semitones having pitches proceeding from low to high in an approximately equitempered scale and forming a plurality of octaves of twelve semitones; switching means for converting said instrument from a keyboard arrangement containing twelve digitals per octave to a keyboard arrangement containing fourteen keyboard digitals per octave, said switching means comprising: a first sequence of ordered terminals corresponding respectively to said digitals; a second sequence of the same number of ordered terminals corresponding respectively to said tone actuator means; a first plurality of electrical switches respectively coupling each of said first sequence of ordered terminals to its corresponding one of said second sequence of ordered terminals thereby to provide said keyboard with the capability of playing in an equitempered scale with twelve digitals per octave; a second plurality of switches respectively coupling each of five consecutive ones of said first sequence of ordered terminals to five corresponding consecutive ones of said second sequence of ordered terminals and decoupling the sixth consecutive one of said first sequence of ordered terminals, respectively coupling the next seven consecutive ones of said first sequence of ordered terminals to the sixth, seventh, eighth, ninth, tenth, eleventh, and twelfth consecutive ones of said second sequence of ordered terminals and decoupling the fourteenth one of said first sequence of ordered terminals, and coupling the next five ones of said first sequence of ordered terminals to the thirteenth, fourteenth, fifteenth, sixteenth, and seventeenth of said second sequence of ordered terminals thereby to provide said keyboard with the capability of playing in an equitempered scale with fourteen digitals per octave.

19. A musical instrument comprising: a continuous keyboard having a plurality of manually actuated alternate upper and lower digitals; a plurality of tone actuator means respectively arranged to provide a continuous sequence of tones having pitches proceeding from low to high in an approximately equitempered scale and forming at least one octave of twelve semitones; switching means respectively coupling successive ones of said digitals to successively higher pitched ones of said tone actuator means for actuating the same thereby to provide a uniform keyboard arrangement having twelve alternating upper and lower digitals per octave and with each successive lower and upper digital actuating a respective tone actuator means of successively higher pitch; a plurality of indicator lamps respectively associated with each of said lower digitals; and means for selectively actuating first, second, third and fourth groups of said indicator lamps, each of said groups of indicator lamps comprising an identical geometrical pattern of lamps respectively spaced apart by the same number of lower digitals.

20. The combination of claim 19 where each of said groups of said indicator lamps comprises lamps of a first kind spaced apart by an even multiple of six lower digitals and lamps of a second kind spaced from each other and from said lamps of said first kind by one lower digital.

21. A musical instrument comprising: a uniform keyboard having a plurality of manually actuated alternately disposed upper and lower digitals; a plurality of tone actuator means respectively arranged to provide a continuous sequence of tones having pitches proceeding from low to high in an approximately equitempered scale forming at least one octave of twelve semitones; switching means respectively coupling successive ones of said digitals to successively higher pitched ones of said tone actuator means for actuating the same thereby to provide a uniform keyboard arrangement having twelve successive digitals per octave and with each successive digital actuating a respective tone actuator means of successively higher pitch; illuminating means for marking predetermined portions of said keyboard; and means for moving said illuminating means along said keyboard a distance of at least six successive lower digitals whereby the musician may be oriented when playing in different musical keys.

References Cited in the file of this patent

UNITED STATES PATENTS

| | | |
|---|---|---|
| 836,827 | Pool | Nov. 27, 1906 |
| 2,223,009 | Rupp et al. | Nov. 26, 1940 |
| 2,483,617 | Bradley | Oct. 4, 1949 |
| 2,484,930 | Cornelius | Oct. 18, 1949 |
| 2,820,391 | Janssen et al. | Jan. 21, 1958 |

FOREIGN PATENTS

| | | |
|---|---|---|
| 1,094,276 | France | Dec. 1, 1954 |